June 4, 1968     H. S. OVERMAN     3,386,138
ENVIRONMENT DISCRIMINATING RELEASE MECHANISM
Filed March 8, 1966     2 Sheets-Sheet 1

INVENTOR
HAROLD S. OVERMAN

BY *Claude Funkhouser*
ATTORNEY

June 4, 1968  H. S. OVERMAN  3,386,138
ENVIRONMENT DISCRIMINATING RELEASE MECHANISM
Filed March 8, 1966  2 Sheets-Sheet 2

3,386,138
ENVIRONMENT DISCRIMINATING
RELEASE MECHANISM
Harold S. Overman, Dahlgren, Va., assignor to the United States of America as represented by the Secretary of the Navy
Filed Mar. 8, 1966, Ser. No. 534,972
9 Claims. (Cl. 24—211)

ABSTRACT OF THE DISCLOSURE

A fastening means, especially adapted to release upon a rapid increase of the pressure within an enclosure, comprising a head, a body secured within said head by a first detent, a compensator slidably mounted within said body and subjected to spring pressure and located with respect to said body by a second detent, and a plunger within said compensator connected to a piston so that movement of the piston causes movement of the plunger, thereby releasing said second detent to allow movement of the compensator which in turn releases said first detent to allow separation of the body from the head.

---

This invention relates to a release or actuating mechanism. More particularly, it relates to a fastener which can be used for securing covers over openings in pressure vessels, the head of such fastener being capable of releasing itself to thereby vent the vessel when subject to hazardous conditions.

Certain compartments aboard naval ships are used for storage of volatile and flammable materials and certain magazines are used for harboring propellants, pyrotechnic materials or rocket motors. Such compartments, under normal conditions must be closed off from adjacent compartments if the propagation of flames, noxious vapors, etc., is to be avoided. Moreover, unless the compartment involved is located above the weather decks it must be closed in order to maintain the watertight integrity of the ship.

If any of the above mentioned flammable materials should become ignited by accident, spreading of the conflagration to other materials in the compartment would have to be prevented; otherwise, a catastrophic chain reaction could develop. Damage control devices, therefore, such as water sprinkling systems are usually provided to counter the spread of such conflagrations. However, it has been shown that such systems fail to function effectively unless venting of the affected compartment is made possible immediately upon detection of the casualty. Proper venting permits release of the hot gases and prevents the pressure in the compartment from building up to a high level. In such a way, the damage control system will perform its function more efficiently.

Heretofore, one method used for providing compartment venting involves locating one or more relatively large openings in the bulkheads comprising the compartment wall, or in the deck or ceiling of the compartment, and covering these openings with metal plates which are secured by means of fasteners such as bolts, studs or the like. Such fasteners are so designed and applied that internal pressure within the closure will induce stress in the fastener. When the pressure differential between the interior and the exterior of the compartment reaches a predetermined level, at which venting of the compartment is desired, the induced stress in the fasteners will be sufficient to cause them to fail, thereby venting the compartment by releasing the closure. Depending on design requirements, the route of the vented gases may be direct to the atmosphere, or via adjacent compartments to a duct system or to the atmosphere. Fastener failure includes either tension, wherein a bolt or stud is necked down or notched so that it will separate into two parts when the stress exceeds the ultimate strength; or shear, wherein failure of a shear pin serves to release a collar from the body of the fastening device.

Another method employed, based on the same general principle of mechanical failure due to pressure-induced stress, consists in making the closure in the form of a relatively weak diaphragm or notched plate, so that failure occurs in the closure itself, rather than in the fasteners.

One inherent disadvantage limiting the effectiveness of existing venting methods is their inability to discriminate between environments in which venting should be effected and those in which water-and-gas-tightness should be maintained.

To fulfill ship specifications for watertight integrity, closures on most bulkheads must remain in place when subjected to static or gradually increasing pressure differentials of relatively high magnitude of about 30 pounds per square inch. However, in order to combat casualties involving combustion of flammables in a compartment, the closures must be released upon experiencing relatively low pressure differentials (3–10 pounds per square inch) when these are attained within a very short period, i.e., when the rate of increase of pressure is quite high, as would be the case if rocket propellant were accidentally ignited within the compartment. Those venting systems designed to release in the 3–10 p.s.i. range would, therefore, be incapable of maintaining the requisite watertight integrity.

Another inherent disadvantage in existing systems is the unreliability of predicted or design release pressure.

Under static conditions, or when the application of pressure is at a very low rate, the pressure at which existing systems will release the closures can be predicted with fair accuracy and verified experimentally. Under higher rates of increase of pressure, however, dynamic conditions exist such that actual release pressure might be much higher or much lower than the design release pressure, depending on the particular structural configuration of the closure and its fastenings, and on such factors as the masses and flexibility of the component parts. Also, when the closure is secured by several fasteners which do not directly sense the pressure, unsymmetrical loading can occur, with the result that one fastener bears a disproportionate share of the load and fails before design release pressure is reached. Force on the other fasteners is increased, resulting in their sequential failure and release of the closure before reaching the design release pressure.

Another grave disadvantage of existing venting systems is their susceptibility to shock.

The mass of most closures is sufficient to load the fasteners beyond their design failure load when shock-induced accelerations of a certain magnitude are applied in a direction tending to produce vent opening. Any design failure pressure less than that needed to withstand a given acceleration, would cause premature opening of the closure.

It is therefore an object of this invention to provide a fastener mechanism which releases when pressure is exerted against a portion of the fastener.

Another object of this invention is to provide a release fastener wherein the fastener comprises a cylindrical body, a removable head and a nut threaded on the body.

A further object of this invention is to provide a release mechanism having telescoping body, compensator and pilot with a releasable head on one end of the body, the body carrying a laterally moving detent engageable with the head to lock it thereon; the compensator carrying a laterally moving detent engageable with the body to lock the compensator in a retracted position; the pilot being held in an extended position; and the fastener including spring means separately urging the compensator and the pilot to their extended positions.

A still further object of this invention is to provide a release mechanism having a hollow cylindrical body, nut means on one end thereof and a releasable head on its other end, hollow shafts releasably retained within the body, a pervious piston fitted on an end of one of the shafts so that pressure, presenting a hazardous condition, exerted against the piston will serve to release the head.

A still further object of this invention is to provide a release mechanism having means thereon preventing inadvertent actuation or permanent impairment of its functions when subjected to high-impact mechanical shock.

A still further object of this invention is to provide an actuating mechanism for venting pressure vessels under hazardous internal pressure conditions while resisting external shock-induced accelerations tending to produce vent opening.

A still further object of this invention is to provide a release fastener wherein its predicted release pressure is reliable within predetermined ranges of pressure and pressure differentials.

A still further object of this invention is to provide a release fastener used for securing covers over openings in pressure vessels wherein the fastener is capable of sensing the pressure and variation of pressure within the vessel, discriminating between those characteristics of pressure variation which are associated with certain hazardous conditions and which are not so associated, acting to release the closures when hazardous conditions are detected, so as to vent the contents of the vessel to the outside, and maintaining the integrity of the closures when the internal pressure increases in a manner not associated with the hazardous conditions cited.

Other objects, advantages and novel features of the invention will become apparent from the following detailed description of the invention when considered in conjunction with the accompanying drawings wherein.

Figure 1:
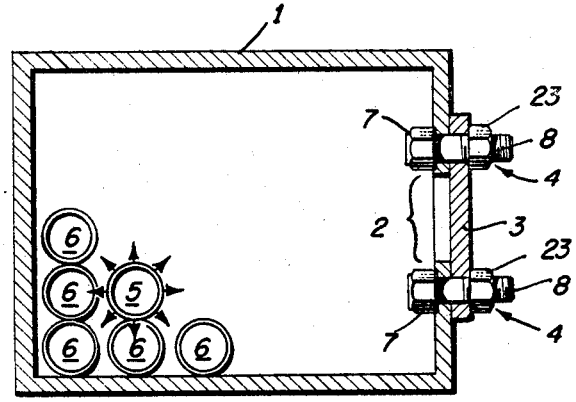
FIG. 1 is a graphic illustration of a configuration showing possible use of the release mechanism securing a cover over an opening of a pressure vessel.
Figure 2:
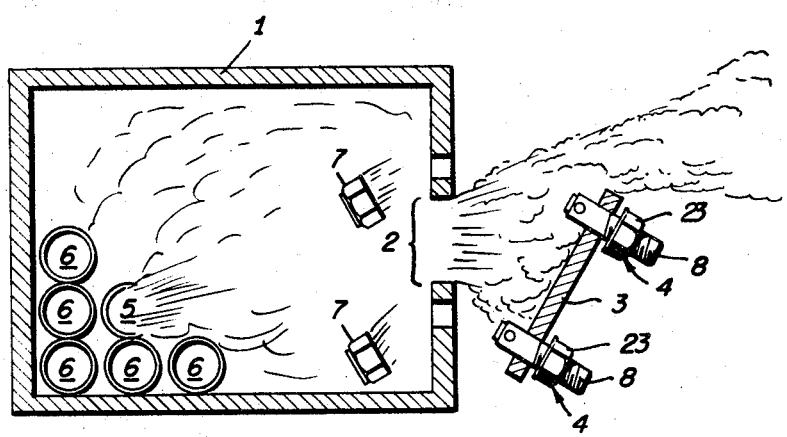
FIG. 2 illustrates the same configuration shown in FIG. 1 immediately after the release mechanism has operated so as to vent the vessel.

In FIG. 1, the numeral 1 refers to a cross-sectional view of a compartment equipped with a venting system capable of utilizing this invention. An opening 2 in the compartment is covered by a closure 3 which is secured to the compartment wall by fasteners 4. In FIG. 1, only the fasteners 4 are the subject of this invention, the other components being included merely to illustrate a particular mode of application of the invention. Also, shown in FIG. 1 is a symbolic view of a rocket motor 5 which is assumed to have been accidentally ignited within the compartment. The efflux of hot, high-pressure gas from this rocket motor is represented in FIG. 2. Additional rocket motors which must be protected from igniting, in the environment produced by burning of motor 5, through the operation of this invention, are indicated by the numerals 6.

FIG. 2 illustrates the same configuration shown in FIG. 1 immediately after this invention has operated so as to vent the compartment. At the stage illustrated in FIG. 2, detection, by this invention, of a pressure pattern indicative of a need for venting has caused the heads 7 of the fasteners to separate from the bodies 8 of the fasteners, through means to described subsequently. After separation of heads 7 from bodies 8, the closure 3 is free to separate from the wall of the compartment under the action of the higher pressure within the compartment, and the gaseous contents of the compartment can then escape via the opening 2, as indicated in FIG. 2.

Venting of the hot gaseous contents permits the damage control devices to function more effectively.

Figure 3:
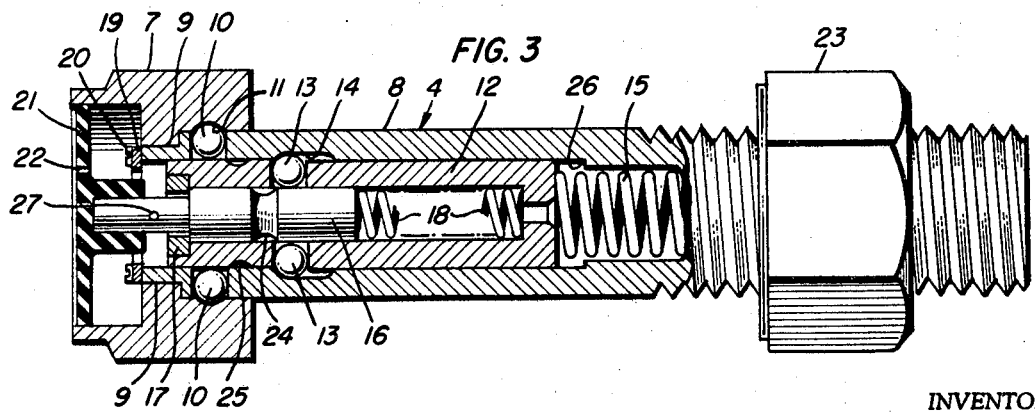
FIG. 3 is a cross-sectional view of one embodiment of the fastener.
Figure 4:
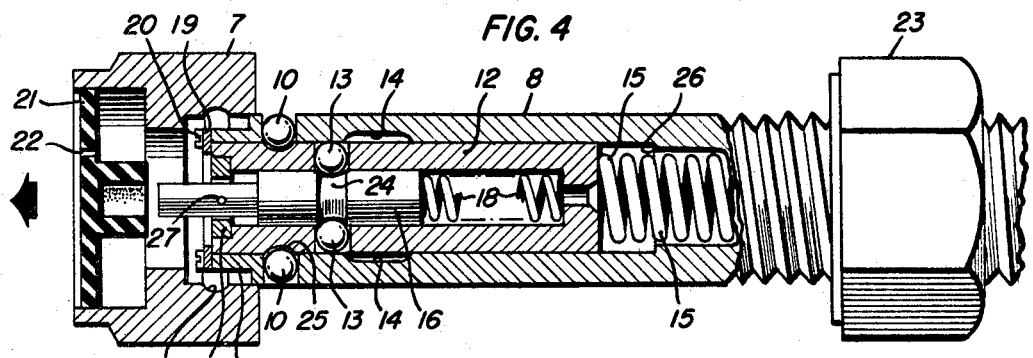
FIG. 4 is a view similar to that of FIG. 3 with the compensator in an extended position and the head released from the body.
Figure 5:
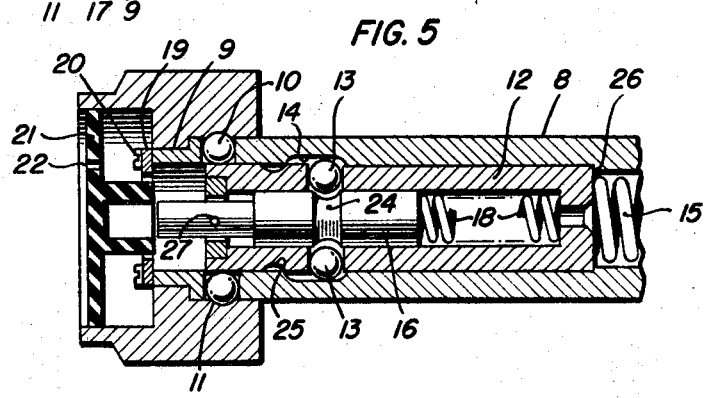
FIG. 5 is a partial view similar to that of FIG. 3 showing the fastener responding to externally applied shock without prematurely releasing the head.

Referring to FIGS. 3-5 inclusive, in the assembled condition, the head 7 is positioned on the end of the body 8, having an axial bore therein, and prevented from rotating relative to the body by means of two diametrically opposed flat surfaces 9 on the body which mate with a correspondingly shaped hole in the head. The head is held in place longitudinally by a detent in the form of a number of balls 10, located in radial holes in the body, which extend radially outward beyond the periphery of the body to engage an annular groove 11 in the head. The balls are maintained in the outward position by the presence of the compensator 12, a cylindrical component which fits freely into and is slideably received within a central longitudinal hole in the body and which is prevented from moving toward the head end of the body by a detent in the form of several balls 13 located in radial holes in the compensator and extending radially outward to engage an annular groove 14 in the body. The annular groove 14 is elongated in the longitudinal direction so as to permit rearward motion of the compensator for purposes to be described later. The balls 13 are held against the head end of this groove by the force on the compensator spring 15. The diameter of both balls 10 and 13 is greater than the thickness of the body wall and compensator wall, respectively, so that the balls will either project outwardly, as in FIG. 3, for engagement or inwardly, as in FIG. 4, for release. In addition, the balls 13 are maintained in the outward position by the presence of the pilot 16, a cylindrical component which fits freely into and is slideably received within a central longitudinal hole in the compensator. The pilot is restrained within the compensator by a concentric ring 17 affixed to the compensator so as to engage a shoulder on the pilot, and is maintained in a headward position by the force of the partially compressed pilot spring 18. A retaining washer 19, attached to the head end of the body by a number of screws 20, serves to prevent the compensator-pilot assembly from being ejected from the body when the device is actuated. The washer also insures a positive alignment of balls 10 with groove 25 during actuation. A piston 21 is assembled on the head end of the pilot with a light push friction fit, and the outer periphery of the piston is closely fitted within a cylindrical bore in the head 7, to form a very nearly air-tight seal. The pilot is made hollow to avoid interference with motion due to entrapped air. Passage of air from the space behind the piston to the interior of the pilot can occur via the transverse hole 27. A bleeder hole 22 is provided in the piston for purposes to be described subsequently. The end of the body opposite the head has been threaded to accommodate a nut 23 so that the device has the configuration of a bolt/nut fastener. It will be recognized that this choice of configuration is arbitrary, and that the principles involved could be applied equally well to other configurations such as studs or latches.

The operation of the first version of the device is as follows:

The fastener is installed, for example, as a component of a venting system, with its head end, containing the piston 21, inside of the compartment to be protected, or otherwise communicating with the interior of the compartment.

Under static conditions, the pressure is the same on both faces of the piston 21, because of the bleeder hole 22; however if the pressure inside the compartment commences to rise, a pressure difference will exist across the piston until such time as the flow of air or gas through the bleeder hole has been sufficient to equalize the pressure. The pressure difference across the piston exerts a force which tends to drive the pilot 16 inward (i.e., toward the right in FIG. 3) against the resisting force of the pilot spring 18. When the pilot spring has been compressed sufficiently to produce alignment of the groove 24 on the pilot with the balls 13 in the compensator (as shown in FIG. 4), the balls 13 will drop into the groove 24, releasing the compensator. The compensator will then move outward (i.e., toward the left in FIG. 3) under the force of the compressed compensator spring 15. When the compensator has completed its stroke to the left, the groove 25 on the compensator will be in alignment with the balls 10 in the body 8 of the fastener (FIG. 4). The balls 10 will then be free to drop into the groove upon the application of any slight force tending to separate the head from the body, and will thus release the head from the body. As the head moves away from the body (referring to FIG. 4), it encounters the piston 21, which, being attached to the pilot 16 by a light push fit as described above, is free to move with the head, and therefore offers little resistance to the separation process. The ability of the device to discriminate between conditions in which release is desirable and those in which it is not is provided by the bleeder hole 22. Release is not desirable when the pressure inside the compartment increases very slowly even though it may increase to a high value. Under such conditions, the bleeder hole permits air to flow to the interior of the fastener so that the pressure on the two sides of the piston remains approximately equal, hence the device does not release. Release is always desirable when the pressure increases instantaneously by a predetermined low increment. Under such conditions the flow of air through the bleeder hole during the short time interval involved is insignificant, hence the device will release by the process described above. Release is also desirable when the pressure increases rapidly although not instantaneously; however, in such cases it is desirable that the pressure at which release occurs would vary inversely with the rate of rising of pressure over some selected range; (i.e., when the pressure is rising very rapidly, release is desired at a lower pressure than is the case when the pressure is rising at a more moderate rate). Under these conditions the longer time interval associated with the more moderate rise in pressure permits a larger quantity of air to flow through the bleeder hole before the actuation of the device is consummated, hence the desired inverse relationship between rate of rise and release pressure is achieved. In practical applications, the ranges of combinations of pressure and rates of change of pressure which represent "hazardous" situations requiring venting would first be defined quantitatively, and the design adjusted to discriminate between such situations and others by varying the size of the bleeder hole, the spring rate and initial compression of the pilot spring, and if necessary, the internal volume of the fastener (so as to increase or decrease, as appropriate, the effect of compression of the air inside the device by the moving piston). In the operation just described, the compensator 12 and compensator spring 15 performed the important function of increasing the magnitude of the force available to release the balls 10 from contact with the grooves 11 over the magnitude which would be available if the pilot were used directly to effect release. The force which the pilot can exert is limited by the product of the pressure and the area of the piston, and substantially all of this force must be applied to compress the pilot spring; otherwise, the accuracy of its calibration would be affected. The compensator spring can be made to exert considerably more force than the pilot and this force can be used to overcome frictional resistance.

Referring to FIG. 3, it can be seen that externally applied shock forces tending to accelerate the body of the fastener toward the right or in any direction transverse to its longitudinal axis will produce no relative motion of components within the limitations of their mechanical strength. A force tending to accelerate the body toward the left, however, will tend to induce motion of the piston 21 and pilot 16 in the opposite direction relative to the body (i.e., toward the right in FIG. 3). In the absence of the compensator 12, such motion would induce inadvertent triggering of the release mechanism. The compensator prevents such inadvertent release in the following manner: Under acceleration of the body toward the left, as described above, the induced relative motion of the compensator with respect to the body will be initially the same as that of the pilot, i.e., to the right and at essentially the same velocity; hence there will be little if any relative motion between the pilot and the compensator, and no alignment of the pilot grooves 24 with the balls 13, as long as the compensator is free to continue moving with respect to the body. The elongated groove 14 in the body permits the compensator to move freely to the right until it contacts the internal shoulder 26 on the body (FIG. 5). Should the applied acceleration be of such long duration that the compensator does contact the shoulder, the pilot will move toward the right relative to the compensator, possibly aligning the grooves 24 with the balls 13 (FIG. 5). The device will not release at this time however, because the compensator is retracted toward the right. Upon cessation of the applied acceleration, the pilot spring will move the pilot back toward the left with respect to the compensator, driving the balls 13 radially outward to engage again the elongated groove 14 and prevent motion of the compensator to the release position. To assure that this action occurs, the ratio of the pilot spring force to the mass of the pilot is made larger than the ratio of the compensator spring force to the mass of the compensator; otherwise the pilot might not return quickly enough to effect engagement of the balls 13 with the elongated groove 14.

Figure 6:
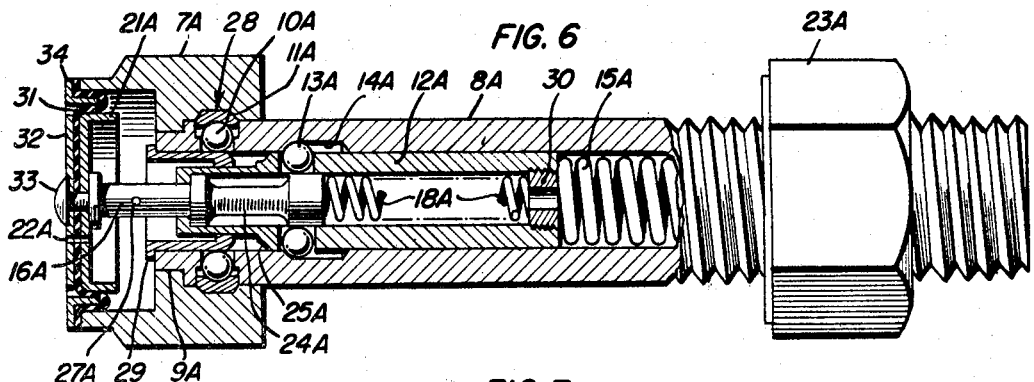
FIG. 6 is a cross-sectional view of another embodiment of the fastener.

In FIG. 6, all components of the second version which are counterparts of corresponding components in the first version have been assigned the same designation number as their corresponding components, followed by the suffix A. Components of the second version which have no counterpart in the first version have been assigned numbers without suffixes.

Figure 7:
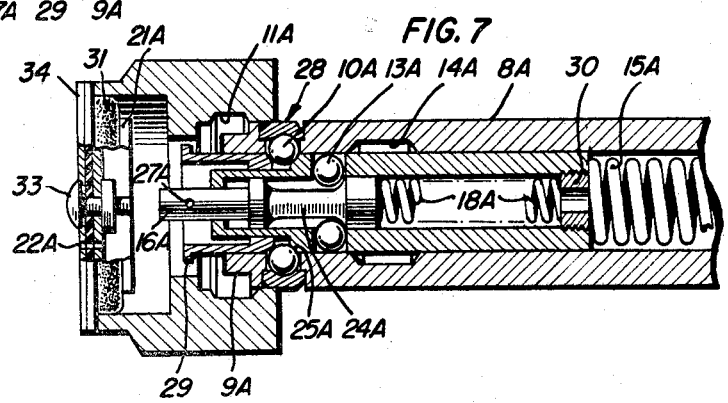
FIG. 7 is a partial view similar to that of FIG. 6 with the compensator in an extended position and the head released.

Referring to FIGS. 6 and 7, in the assembled condition, the head 7A is positioned on the end of the body 8A and prevented from rotating with respect to the body by the flat surfaces 9A, all as described in the description of the first version. The head is held in place longitudinally by an annular ring 28 which extends radially outward beyond the periphery of the body to engage an annular groove 11A in the head. The ring 28 is split at one point (or more) on its periphery to facilitate expansion and contraction of its diameter, and is held in the expanded position, shown in FIG. 6, by a number of balls 10A located in radial holes in the body. The balls are maintained in a radially outward position by means of a thimble 29. The diameter of balls 10A and the thickness of ring 28 combined is greater than the thickness of the body wall so that the ring with its underlying balls will project outwardly as in FIG. 6 for engagement or inwardly as in FIG. 7 for release. The interposition of ring 28 between balls 10A and groove 11A is an improvement over the first version, in which the balls 10 are in direct contact with grooves 11 (FIG. 3), for two reasons:

(1) The ring 28 provides area contact against the right face of the groove 11A in lieu of the point contact provided by the balls 10 against groove 11. This permits the fastener to be tightened, by means of the nut 23A, to a significantly higher tension, without damaging the contacting surfaces, than is possible in the first version.

(2) The slope of the surface of contact between the right face of ring 28A and the left face of groove 11A can be made steep enough to ensure that the radial component of the force between these surfaces is small enough to prevent damage at the point of contact between the balls 10A and the thimble 29, thus protecting these surfaces and reducing the friction at this point, which might otherwise interfere with the desired motion of the thimble.

The compensator 12A fits freely within central holes in both the body 8A and the thimble 29. The compensator is restrained against leftward (headward) motion by the engagement of balls 13A in groove 14A and resiliently against rightward motion by the compensator spring 15A, all substantially as previously described for the first version. The balls 13A are held outward by the pilot 16A, which fits freely within a central hole in the compensator and is restrained against leftward motion by an internal shoulder at the end of the compensator and resiliently against rightward motion by the pilot spring 18A. A plug 30 retains the pilot spring in place. The groove 24A in the pilot is elongated to permit the compensator to move independently of the pilot after actuation has occurred. A piston assembly consisting of a piston 21A, a flexible diaphragm 31, a retainer plate 32 and a rivet 33 is mounted on the left end of the pilot by means of an extension of the body of the rivet. This extension mates with a hole in the pilot with a push, friction fit. The periphery of the flexible diaphragm is secured to the head 7A by a pressed-in ring 34 of angular cross-section, to form a perfectly air-tight peripheral seal. A bleeder hole 22A is provided through the piston assembly for the same purpose served by bleeder hole 22 in the first version. A hole 27A is provided in the pilot to permit free flow of air within the interior volume of the fastener, in the same manner as provided by hole 27 in the first version.

The operation of the second version of the device is as follows:

The fastener when used as a venting actuator, is installed with its head end in communication with the environment within the compartment to be protected, as previously described for the first version. Also, as previously described, when the pressure within the compartment is static or changing very slowly, the same pressure will exist on both sides of the piston because of the air passage provided by the bleeder hole 22A between the two faces; however, when the compartment pressure rises at a relatively rapid rate, a pressure difference will exist across the piston assembly. When the pressure difference is sufficient to balance the force of the pilot spring in its initially assembled condition, the pilot 16A will commence to move inward. When the pressure difference is sufficient to compress the pilot spring to the point where the pilot groove 24A is aligned with balls 13A, the balls will drop into the groove 24A, releasing the compensator 12A (FIG. 7) in a manner identical to that described for the first version. After moving to the left a short distance, the compensator strikes the thimble 29 (FIG. 7), driving it toward the left and releasing the balls 10A, which move radially inward under the combined force of the elastically expanded ring 28 and the radial component of the force (due to fastener tension) acting between the side of the groove 11A in the head and the sloping side of the ring 28.

The addition of the thimble 29 as a means of retaining the balls 10A in the outward position, in lieu of using the compensator directly for this purpose, is an improvement over the first version for the following reasons:

(1) In the first version, the pressure of the balls 10 on the compensator 12 induces significant frictional resistance to the motion of the compensator when the fastener is tightened securely. This resistance absorbs a significant part of the energy available in the compensator spring 15, and makes its action sluggish from the moment the compensator is released. In the second version, the balls 10A do not contact the compensator; hence it is free to move rapidly when released.

(2) The unrestrained motion of the compensator 12A which can occur before it contacts the thimble 29 permits the spring 15A to impart a large amount of kinetic energy to the compensator. This energy is then delivered to the thimble in a single impact, thus producing enough force to overcome the static friction between balls 10A and the thimble. The force available through such an impact far exceeds the elastic force of the compressed compensator spring, and ensures positive operation of the device.

By means of thimble 29, the force available to complete the actuation of the second stage is increased, wherein the stored energy of spring 15A is converted to kinetic energy delivered in a single impact to effect release.

After the compensator 12A has contacted the thimble 29, both components move toward the left until the groove formed by the combination of the slope on the right hand corner of the thimble and the partial groove 25A on the compensator is in alignment with the balls 10A, which move radially inward, together with the ring 28, under forces described above. This action releases the head 7A from the body 8A.

Shock compensation in the second version is provided by the compensator 12A in a manner identical to that described for the first version. In the particular configuration of the second version described, no positive means of restraining the thimble 29 against motion due to shock has been shown, because the friction between the balls 10A and the thimble 29 has been found sufficient to resist such motion within the range of accelerations of interest. Should additional restraint of the thimble be found necessary in future configurations, it can readily be provided either by a spring acting toward the right (in FIG. 6) against the thimble, or by providing an additional source of friction—for example, an O-ring located in an internal annular groove in the body 8A so as to bear on the periphery of the thimble 29.

It should be noted that the push fit prescribed between the pilot 16A and the rivet 33 should be made tight enough to resist shock-induced relative motion within the acceleration range of interest.

From the above description it can be seen that a release mechanism has been produced which is novel and reliable yet uncomplicated and easy to manufacture. The release mechanism herein is of two stages in which the forces involved in actuation of the first stage can be at a low level, commensurate with the pressures at which detection is desired, and the forces involved in actuation of the second stage can be considerably higher, in order to assure positive actuation under varying conditions of friction and other forces due to preloading. Additionally, the release mechanism includes an accelaration compensating device which, through its inertia, keeps pace with the pilot when shocks are encountered, and prevents inadverent actuation of the mechanism.

An important feature of the instant invention is that it is not dependent for its operation upon external sources of power nor upon internal sources which might require periodic replacement, inspection of special handling precautions such as batteries, chemical capsules or explosive substances.

Instead, the instant invention, which is a combination of a fastener, an environment detection system and a release mechanism all within a single self-contained unit, is completely shockproof and is sensitive to both pressure and rate of change of pressure, with the relative sensitivity to each parameter being selectable by merely varying the mechanical parts, e.g., bleeder hole, size, spring rates, etc.

The fastener is also able to discriminate between combinations of pressure and rate of change of pressure for which actuation of the device is desired, and those for which it is not while being sensitive at all times to low pressure levels. The actuating mechanism is capable of accurate calibration independent of and unaffected by preload or tension in the fastening mechanism.

It is to be understood that the release mechanism herein described need not be associated with a fastening device, but can be readily adapted to a wide variety of other devices as an actuating mechanism. Also, in cases where the discrimination feature is not desired, for example, when it is desired to effect release at a given pressure independently of the rate of change, an alternative design to meet this requirement would result by eliminating the bleeder hole exposed to the interior of the pressure vessel. Furthermore, a centrally drilled hole at the threaded end of the fastener body can be provided if a device is desired which actuates on the basis of the differential pressure between the interior and the exterior of the compartment to be protected.

Obviously, many modifications and variations of the present invention are possible in the light of the above teachings. It is therefore to be understood that within the scope of the appended claims the invention may be practiced otherwise than as specifically described.

What is claimed is:

1. A pressure responsive release mechanism comprising
    an elongated body having an axial bore and a ball-receiving groove-like indentation in said bore;
    a head slidably and releasably receiving one end of said body and having a bore and an inner groove;
    a hollow compensator slidably received within said body bore;
    a first detent in said body movable between an inward releasing position and an outward position in which said first detent engages said inner groove in said head;
    means on said compensator normally holding said first detent in its outward position;
    a second detent in said compensator normally engaged in said body indentation;
    a pilot slidably received in said compensator and having a ball-receiving groove-like indentation on its periphery;
    means normally positioning said pilot to hold said second detent in its engaged position;
    means on said compensator for allowing said first detent to move to said inward releasing position;
    means restraining said pilot within said compensator;
    means biasing said compensator and said pilot toward said head for maintaining said detents in their engaging positions whereby said pilot, upon movement against said biasing means, permits said second detent to withdraw inwardly into said pilot indentation and release said compensator for movement to permit inward withdrawal of said first detent into said compensator release means and to release said head from said body; and
    a piston slidably and releasably assembled to said pilot at one end thereof, whereby a predetermined pressure against said piston will move said pilot to effect the release of said head.

2. The release mechanism of claim 1 wherein said body annular groove is elongated in a longitudinal direction so as to permit motion of said compensator away from said head in response to externally applied shock forces thereby preventing inadvertent actuation of the release mechanism.

3. The release mechanism of claim 1, for use in a pressure vessel and further comprising means whereby the release of said head may be effected only when the pressure within the vessel changes at a rate sufficient to produce a greater pressure on that side of the piston exposed to the pressure in the vessel than on its opposite side.

4. The release mechanism of claim 3, wherein the periphery of said piston is sealed to said head.

5. The release mechanism of claim 4, wherein said first detent comprises a plurality of balls having means carried thereon for coacting with said inner groove on said head.

6. The release mechanism of claim 5, wherein said means for coacting with said inner groove on said head is a split ring.

7. The release mechanism of claim 11, wherein said compensator means holding said first detent in its engaging position comprises effectively an extension of said compensator and said means for releasing said first detent comprises an external annular groove.

8. The release mechanism of claim 7, wherein said extension comprises a thimble which slidably engages one end of said compensator and forms with said compensator said external groove whereby the release of said head is effected after said compensator is released and strikes said thimble, driving it toward said head.

9. The release mechanism of claim 8, wherein said pilot groove-like indentation is elongated in a longitudinal direction so as to permit the compensator to move independently of the pilot after actuation has occurred.

References Cited

UNITED STATES PATENTS 3,052,940   9/1962   Sellers _____ 24—211

FOREIGN PATENTS 909,247   10/1962   Great Britain.

BOBBY R. GAY, *Primary Examiner.*

OTHELL M. SIMPSON, *Examiner.*

ERNEST SIMONSEN, *Assistant Examiner.*

UNITED STATES PATENT OFFICE

CERTIFICATE OF CORRECTION

Patent No. 3,386,138                            June 4, 1968

Harold S. Overman

It is certified that error appears in the above identified patent and that said Letters Patent are hereby corrected as shown below:

Column 10, line 29, claim reference numeral "11" should read -- 1 --.

Signed and sealed this 9th day of December 1969.

(SEAL)
Attest:

Edward M. Fletcher, Jr.
Attesting Officer

WILLIAM E. SCHUYLER, JR.
Commissioner of Patents